United States Patent
Zhang et al.

(10) Patent No.: US 11,700,153 B2
(45) Date of Patent: Jul. 11, 2023

(54) COMMUNICATION CIRCUIT, COMMUNICATION CONTROL METHOD, CIRCUIT BOARD, AND AIR CONDITIONING SYSTEM

(71) Applicant: GD MIDEA AIR-CONDITIONING EQUIPMENT CO., LTD., Foshan (CN)

(72) Inventors: Wenkai Zhang, Foshan (CN); Gucheng Deng, Foshan (CN); Bi Lian, Foshan (CN); Yonglin Huang, Foshan (CN); Guansheng Yang, Foshan (CN)

(73) Assignee: GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 0 days.

(21) Appl. No.: 17/911,970

(22) PCT Filed: Nov. 17, 2020

(86) PCT No.: PCT/CN2020/129445
§ 371 (c)(1),
(2) Date: Sep. 15, 2022

(87) PCT Pub. No.: WO2021/208421
PCT Pub. Date: Oct. 21, 2021

(65) Prior Publication Data
US 2023/0126403 A1 Apr. 27, 2023

(30) Foreign Application Priority Data
Apr. 17, 2020 (CN) .......................... 202010306591.0

(51) Int. Cl.
*H04L 25/02* (2006.01)
*H04B 3/46* (2015.01)

(52) U.S. Cl.
CPC ........... *H04L 25/0272* (2013.01); *H04B 3/46* (2013.01)

(58) Field of Classification Search
CPC ............. H04L 25/0272; H04L 25/0292; H04L 25/028; H04L 25/03; H04B 1/16; H04B 3/46
See application file for complete search history.

(56) References Cited

U.S. PATENT DOCUMENTS

| 7,839,994 B1* | 11/2010 | Roo ..................... H04L 25/4919 |
| | | 379/399.01 |
| 2005/0116745 A1* | 6/2005 | Huang ................ H04L 25/0278 |
| | | 327/108 |

(Continued)

FOREIGN PATENT DOCUMENTS

| CN | 2697963 Y | 5/2005 |
| CN | 102394734 A | 3/2012 |

(Continued)

OTHER PUBLICATIONS

World Intellectual Property Organization (WIPO) International Search Report and Written opinion for PCT/CN2020/129455 dated Feb. 20, 2021 12 Pages (Translation Included).

(Continued)

*Primary Examiner* — Khanh C Tran
(74) *Attorney, Agent, or Firm* — Anova Law Group PLLC (57) ABSTRACT

A communication circuit includes first and second communication nodes including first and second control chips, respectively, and first and second communication chips connected to the first and second control chips, respectively. The first and second communication chips are connected to each other through first and second signal lines, and are configured to transmit a differential signal. The first communication chip includes an output port to output a level signal obtained from the differential signal to the first control chip. The communication circuit further includes a voltage division assembly connected to the first and second signal lines, and configured to cause a voltage value of the first signal line to be higher than that of the second signal line when the first and second signal lines are in idle state. The first control chip includes a detection port connected to the output port to acquire the level signal.

18 Claims, 5 Drawing Sheets

(56) References Cited

U.S. PATENT DOCUMENTS

| | | | |
|---|---|---|---|
| 2010/0188567 A1* | 7/2010 | Ichimura | H04N 21/6336 348/E7.003 |
| 2016/0285715 A1 | 9/2016 | Gielarowski et al. | |
| 2021/0265910 A1* | 8/2021 | Kuo | H03F 1/523 |

FOREIGN PATENT DOCUMENTS

| | | |
|---|---|---|
| CN | 203747788 U | 7/2014 |
| CN | 110069437 A | 7/2019 |
| CN | 209526733 U | 10/2019 |
| CN | 111400120 A | 7/2020 |
| WO | 2009105632 A1 | 8/2009 |

OTHER PUBLICATIONS

The China National Intellectual Property Administration (CNIPA) The First Office Action for Chinese Application 202010306591.0 dated Mar. 1, 2021 11 Pages (With Translation).

The China National Intellectual Property Administration (CNIPA) The Notification to Grant Patent Right for Invention for Chinese Application 202010306591.0 dated May 5, 2021 7 Pages (With Translation).

* cited by examiner

COMMUNICATION CIRCUIT, COMMUNICATION CONTROL METHOD, CIRCUIT BOARD, AND AIR CONDITIONING SYSTEM

CROSS-REFERENCE TO RELATED APPLICATIONS

The present application is a National Stage Entry under 35 U.S.C. § 371 of International Application No. PCT/CN2020/129445, filed on Nov. 17, 2020, which claims priority to Chinese Application No. 202010306591.0, filed on Apr. 17, 2020 and entitled "COMMUNICATION CIRCUIT, COMMUNICATION CONTROL METHOD, CIRCUIT BOARD, AND AIR CONDITIONING SYSTEM," the entire contents of both of which are incorporated herein by reference.

TECHNICAL FIELD

The present disclosure relates to the field of communication technologies, and particularly to a communication circuit, a communication control method, a circuit board, an air conditioning system and a storage medium.

BACKGROUND

One of the common communication methods is 485 communication. 485 communication interfaces generally include an A-line interface and a B-line interface. Only when a communication polarity between two communication nodes is that A-line interfaces are connected correspondingly or B-line interfaces are connected correspondingly, normal communication can be realized. If the communication polarity between the two communication nodes is incorrect, a passive waiting method is used for determining a correctness of a connection polarity in the conventional technology, which means that the connection polarity will not be considered wrong until the secondary node waits a period of time and receives no data, and a communication efficiency is decreased.

SUMMARY

The present disclosure aims to solve at least one of the problems in the conventional technology. Therefore, embodiments of the present disclosure provide a communication circuit, a communication control method, a circuit board, an air conditioning system and a storage medium, which may quickly determine a correctness of a connection polarity between two communication nodes in RS-485 communication, thus improving a communication efficiency.

In a first aspect, an embodiment of the present disclosure provides a communication circuit, which includes:

a first communication node including a first control chip and a first communication chip used for transmitting a differential signal, where the first control chip is connected to the first communication chip, the first communication chip is provided with a first output port to output a level signal obtained from the differential signal to the first control chip;

a second communication node including a second control chip and a second communication chip used for transmitting a differential signal, where the second control chip is connected to the second communication chip, and the second communication chip is connected to the first communication chip through a first signal line and a second signal line; and a voltage division assembly connected to the first signal line and the second signal line, to enable a voltage value of the first signal line to be higher than that of the second signal line when the first signal line and the second signal line are in an idle state;

where the first control chip is provided with a detection port, the detection port is connected to the first output port to acquire the level signal output by the first output port, and the level signal output by the first output port is arranged to determine a correctness of a connection polarity between the first communication chip and the second communication chip.

The communication circuit provided by embodiments of the present disclosure has at least the following beneficial effects: by providing a voltage division assembly, the voltage value of the first signal line is higher than that of the second signal line when the first signal line and the second signal line are in an idle state; and by providing a detection port on the first control chip to acquire the level signal of the first output port of the first communication chip, since the voltage value of the first signal line is higher than that of the second signal line, a correctness of the connection polarity between the first communication chip and the second communication chip may be determined according to the level signal of the first output port, and in such a way the correctness of the connection polarity between the first communication node and the second communication node can be determined quicker than the passive waiting method, thus improving a communication efficiency.

In some embodiments of the present disclosure, the voltage division assembly includes a first resistive element, a second resistive element and a third resistive element, the first resistive element is connected between a power end and the first signal line, the second resistive element is connected between the first signal line and the second signal line, and the third resistive element is connected between the second signal line and a reference ground.

In the above solution, by providing the first resistive element, the second resistive element and the third resistive element, the first signal line may be pulled up to VCC and the second signal line may be pulled down to GND, and the voltage value of the first signal line is higher than that of the second signal line when the first signal line and the second signal line are in an idle state; and the correctness of the connection polarity between two communication nodes in RS-485 communication can be quickly determined without adding complicated components.

In some embodiments of the present disclosure, an absolute voltage value between two ends of the second resistive element is higher than a differential voltage value corresponding to the level signal of the first communication chip or the second communication chip.

In the above solution, by arranging a resistance value relationship among the first resistive element, the second resistive element and the third resistive element, to enable the absolute voltage value between two ends of the second resistive element is higher than the differential voltage value corresponding to the level signal of the first communication chip or the second communication chip, and the first communication chip and the second communication chip can be in a normal communication.

In some embodiments of the present disclosure, the first communication chip is provided with a first differential signal port, and the first differential signal port includes a first communication port and a second communication port; the second communication chip is provided with a second differential signal port, and the second differential signal port includes a third communication port and a fourth communication port; and the first differential signal port and the second differential signal port are connected through the first signal line and the second signal line, and the second resistive element is arranged between the first communication port and the second communication port, and between the third communication port and the fourth communication port.

In the above solution, since there are discontinuous characteristic impedance in the first signal line and the second signal line, by arranging the second resistive element between the first communication port and the second communication port, and between the third communication port and the fourth communication port, a reflected signal generated by the characteristic impedance of the first signal line and the second signal line can be eliminated, and communication of the first communication node and the second communication node will be more stable and reliable.

In some embodiments of the present disclosure, at least one of the first communication chip or the second communication chip is provided with a switching port to switch the connection polarity.

In the above solution, at least one of the first communication chip or the second communication chip is provided with the switching port to switch a connection polarity when the connection polarity between the first communication node and the second communication node is wrong, and the communication between the first communication node and the second communication node can be restored and a stability of communication is ensured.

In some embodiments of the present disclosure, more than two first communication nodes are provided, and the first signal line and the second signal line are used as connection buses to respectively connect the second communication node with the first communication nodes.

In the above solution, by providing a plurality of first communication nodes, and connecting the first communication nodes with the second communication node through a connection bus, a signal transmission system can be formed, and a multi-split solution is realized.

In a second aspect, an embodiment of the present disclosure further provides a communication control method applied to a communication circuit, where the communication circuit includes:

a first communication node including a first control chip and a first communication chip used for transmitting a differential signal, where the first control chip is connected to the first communication chip, the first communication chip is provided with a first output port to output a level signal obtained from the differential signal to the first control chip;

a second communication node including a second control chip and a second communication chip used for transmitting a differential signal, where the second control chip is connected to the second communication chip, and the second communication chip is connected to the first communication chip through a first signal line and a second signal line; and a voltage division assembly connected to the first signal line and the second signal line respectively, enable a voltage value of the first signal line to be higher than that of the second signal line when the first signal line and the second signal line are in an idle state;

where the first control chip is provided with a detection port, and the detection port is connected to the first output port; and the communication control method includes:

acquiring, by the first control chip, the level signal output by the first output port through the detection port when the first signal line and the second signal line are in an idle state; and determining, by the first control chip, a correctness of a connection polarity between the first communication chip and the second communication chip according to the level signal output by the first output port.

The communication control method provided by embodiments of the present disclosure has at least the following beneficial effects: by providing a voltage division assembly, the voltage value of the first signal line is higher than that of the second signal line when the first signal line and the second signal line are in an idle state; and by providing a detection port on the first control chip to acquire the level signal of the first output port of the first communication chip, since the voltage value of the first signal line is higher than that of the second signal line, a correctness of the connection polarity between the first communication chip and the second communication chip may be determined according to the level signal of the first output port, and in such a way the correctness of the connection polarity between the first communication node and the second communication node can be determined quicker than the passive waiting method, thus improving a communication efficiency.

In some embodiments of the present disclosure, the determining, by the first control chip, the correctness of the connection polarity between the first communication chip and the communication chip according to the level signal output by the first output port, includes at least one of the followings:

determining, by the first control chip, the connection polarity between the first communication chip and the second communication chip to be correct when the level signal of the first output port is of a high level; and determining, by the first control chip, the connection polarity between the first communication chip and the second communication chip to be wrong when the level signal of the first output port is of a low level.

In some embodiments of the present disclosure, the determining, by the first control chip, the correctness of the connection polarity between the first communication chip and the second communication chip according to the level signal output by the first output port, includes at least one of the followings:

determining, by the first control chip, the connection polarity between the first communication chip and the second communication chip to be correct when the level signal of the first output port is of a high level with a duration longer than or equal to an idle duration of the first signal line and the second signal line; and determining, by the first control chip, the connection polarity between the first communication chip and the second communication chip to be wrong when the level signal of the first output port is of a low level with a duration longer than or equal to an idle duration of the first signal line and the second signal line.

In the above solution, it is beneficial that the duration of the level signal of the first output port determined is higher than or equal to the idle duration of the first signal line and the second signal line, and a correctness of determination is improved.

In some embodiments of the present disclosure, the first communication chip is provided with a switching port to switch the connection polarity, and the communication control method further includes:

controlling, by the first control chip, the first communication chip to switch a polarity through the switching port in response to the connection polarity between the first communication chip and the second communication chip determined to be wrong.

In the above solution, a polarity is switched when the connection polarity between the first communication node and the second communication node is wrong, to restore the communication between the first communication node and the second communication node, and a stability of communication is ensured.

In the above solution, the first signal line and the second signal line being in an idle state includes at least one of the followings:

in a scenario that the first communication node and the second communication node are electrified for a first time, both the first communication chip and the second communication chip are set to be in a receiving state; and in a scenario that the first communication node is reconnected to the second communication node after disconnection occurs during communication, both the first communication chip and the second communication chip are set to be in a bus release state.

In the above solution, when the first communication node and the second communication node are electrified for the first time, both the first communication chip and the second communication chip are set to be in a receiving state, and thus the first signal line and the second signal line have no communication transmission, the voltage value of the first signal line is higher than that of the second signal line, to facilitate the determination of the connection polarity. And the first communication node is reconnected with the second communication node once disconnection occurs during communication, both the first communication chip and the second communication chip are set to be in a bus release state, wand thus the first signal line and the second signal line have no communication transmission, the voltage value of the first signal line is higher than that of the second signal line, to facilitate the determination of the connection polarity.

In a third aspect, an embodiment of the present disclosure further provides a communication circuit, which includes:

a first control chip; and a first communication chip connected to the first control chip, configured to transmit a differential signal through a first signal line and a second signal line, where the first communication chip is provided with a first output port to output a level signal obtained from the differential signal to the first control chip;

where the first control chip is provided with a detection port, the detection port is connected to the first output port to acquire the level signal output by the first output port, and the level signal output by the first output port is used for determining a correctness of a connection polarity between the first communication chip and the first signal line or the second signal line.

The communication circuit provided by embodiments of the present disclosure has at least the following beneficial effects: by providing a detection port on the first control chip to acquire the level signal of the first output port of the first communication chip, on the premise that the voltage value of the first signal line is higher than that of the second signal line, the correctness of the connection polarity between the first communication chip and the second communication chip may be determined according to the level signal of the first output port, and in such a way the correctness of the connection polarity between the first communication node and the first signal line and the second signal line can be determined quicker than the passive waiting method, thus improving a communication efficiency.

In a fourth aspect, an embodiment of the present disclosure further provides a circuit board, which includes the communication circuit in the first aspect or the third aspect.

Therefore, according to the circuit board above, by arranging the voltage division assembly, the voltage value of the first signal line is high relative to the second signal line when the first signal line and the second signal line are in an idle state, then by arranging the detection port on the first control chip to acquire the level signal of the first output port of the first communication chip, since the voltage value of the first signal line is high relative to the second signal line, the correctness of the connection polarity of the first communication chip and the second communication chip may be determined according to the level signal of the first output port, and compared with a passive waiting method, the correctness of the connection polarity of the first communication node and the second communication node can be quickly determined, thus improving a communication efficiency.

In a fifth aspect, an embodiment of the present disclosure further provides an air conditioning system, which includes the circuit board in the fourth aspect;

or, at least one processor and a memory communicated with the at least one processor, where the memory is configured to store an instruction executable by the at least one processor, and the instruction is executed by the at least one processor to execute the communication control method in the second aspect.

Therefore, according to the air conditioning system above, by providing a voltage division assembly, the voltage value of the first signal line is higher than that of the second signal line when the first signal line and the second signal line are in an idle state, then by providing a detection port on the first control chip to acquire the level signal of the first output port of the first communication chip, since the voltage value of the first signal line is higher than that of the second signal line, the correctness of the connection polarity between the first communication chip and the second communication chip may be determined according to the level signal of the first output port, and the correctness of the connection polarity between the first communication node and the second communication node can be determined quicker than the passive waiting method, thus improving a communication efficiency.

In a sixth aspect, an embodiment of the present disclosure further provides a computer-readable storage medium, where the computer-readable storage medium stores a computer-executable instruction to be executed by a computer to execute the communication control method in the second aspect.

BRIEF DESCRIPTION OF THE DRAWINGS

The above and/or additional aspects and advantages of the present disclosure become apparent and easy to understand from the description of embodiments in conjunction with the following drawings, where.

DETAILED DESCRIPTION

Embodiments of the present disclosure are described below in detail, illustrations of which are shown in the accompanying drawings, where identical or similar reference numerals denote identical or similar elements or elements of the same or similar functions. The embodiments described below by reference to the accompanying drawings are exemplary and are intended only to explain the present disclosure and are not to be construed as limiting the present disclosure.

In the description of the present disclosure, it should be understood that any orientation/position related description, such as the orientational or positional relationship, such as, up, down, front, rear, left, right, and the like, is based on the orientational or positional relationship shown in the accompanying drawings, is only for the purpose of facilitating the description of the present disclosure and simplifying the description, and does not indicate or imply that the device or element must have a specific orientation or position, be constructed and operated in a specific orientation or position, and therefore shall not be understood as a limitation to the present disclosure.

In the description of the present disclosure, "at least two" means one or more, "a plurality of" means at least two, "higher than," "less than," "more than," and the like are understood as excluding this number, and "above," "below" and "within" are understood as including this number. If there is the description of "first" and "second," it is only for the purpose of distinguishing features, and shall not be understood as indicating or implying relative importance or implying the number of indicated features or implying the order of indicated features.

In the description of the present disclosure, words such as "arranging," "installing," and "connecting" shall be understood in a broad sense unless otherwise expressly limited, and those skilled in the art may reasonably determine the specific meanings of the above words in the present disclosure with reference to the context of the solution.

One of the commonly used communication methods is 485 communication is, 485 communication interfaces are generally divided into an A-line interface and a B-line interface, and only when a communication polarity between two communication nodes is that the A-line interface is connected correspondingly and the B-line interface is connected correspondingly, normal communication can be realized. If the communication polarity between two communication nodes are incorrect, a passive waiting method is used for determining a correctness of a connection polarity in the solution of the conventional technology, which means that the connection polarity will not be considered wrong until the secondary node waits a period of time and receives no data, and a communication efficiency is decreased.

On this basis, embodiments of the present disclosure provide a communication circuit, a communication control method, a circuit board, an air conditioning system and a storage medium, which may quickly determine a correctness of a connection polarity between two communication nodes in RS-485 communication, thus improving a communication efficiency.

The embodiments of the present disclosure are further described hereinafter with reference to the accompanying drawings.

Figure 1:
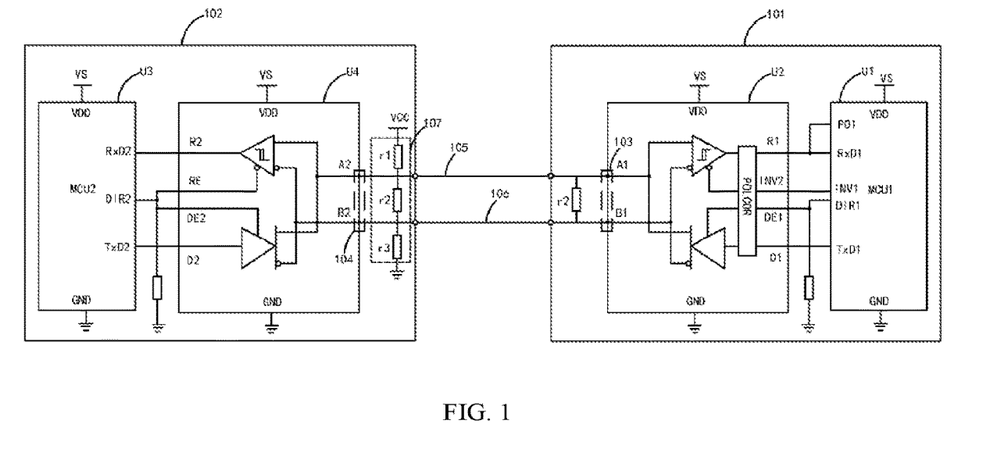
FIG. 1 is a schematic circuit diagram of a communication circuit provided by an embodiment of the present disclosure (with correct connection polarity)
Figure 2:
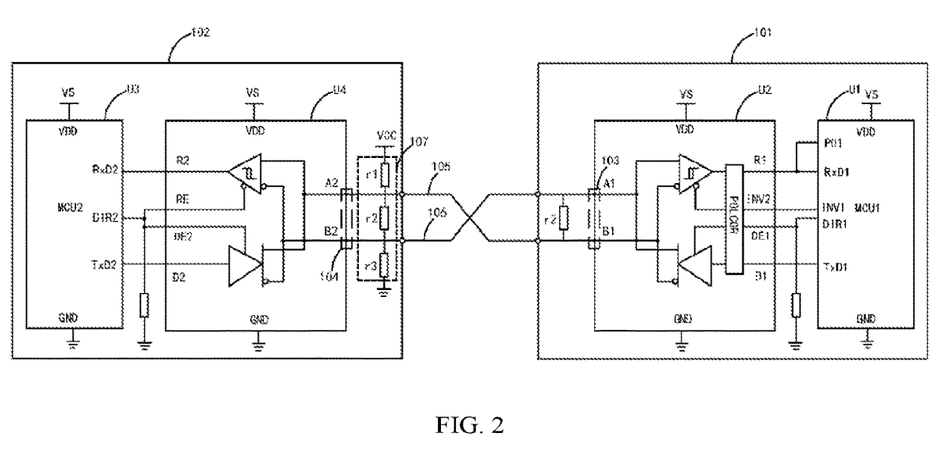
FIG. 2 is a schematic circuit diagram of the communication circuit provided by embodiments of the present disclosure (with wrong connection polarity)

With reference to FIG. 1 and FIG. 2, an embodiment of the present disclosure provides a communication circuit, which includes a first communication node 101 and a second communication node 102. The first communication node 101 includes a first control chip U1 and a first communication chip U2 used for transmitting a differential signal, and the first control chip U1 is connected to the first communication chip U2. The second communication node 102 includes a second control chip U3 and a second communication chip U4 used for transmitting a differential signal, and the second control chip U3 is connected to the second communication chip U4. The first communication chip U2 and the second communication chip U4 are connected through a first signal line 105 and a second signal line 106, where the differential signals above may be RS-485 differential signals, and RS-485 communication is established between the first communication node 101 and the second communication node 102.

In an embodiment, the first control chip U1 is provided with a secondary output port TxD1, a secondary input port RxD1, a secondary enabling control port DIR1 and a switch control port INV1, and the first communication chip U2 is provided with a first differential signal port 103, a first output port R1, a switch port INV2, a first enabling port DE1 and a first input port D1. The secondary output port TxD1 is connected to the first input port D1, the secondary enabling control port DIR1 is connected to the first enabling port DE1 and is connected to a reference ground, the switch control port INV1 is connected to the switch port INV2, and the secondary input port RxD1 is connected to the first output port R1. The first differential signal port 103 includes a first communication port A1 and a second communication port B1.

In an embodiment, the second control chip U3 is provided with a primary output port TxD2, a primary input port RxD2 and a primary enabling control port DIR2, and the second communication chip U4 is provided with a second differential signal port 104, a second output port R2, a second enabling port DE2/RE and a second input port D2. The primary output port TxD2 is connected to the second input port D2, the primary enabling control port DIR2 is connected to the second enabling port DE2/RE and is connected to a reference ground, and the primary input port RxD2 is connected to the second output port R2. The second differential signal port 104 includes a third communication port A2 and a fourth communication port B2.

The first communication port A1, the second communication port B1, the third communication port A2 and the fourth communication port B2 are connected through the first signal line 105 and the second signal line 106. There are two kind of connection polarities. With reference to FIG. 1, one of the connection polarities is that the first communication port A1 is connected to the third communication port A2 and the second communication port B1 is connected to the fourth communication port B2, and in such a way that the connection polarity between the first communication node 101 and the second communication node 102 is correct, and RS-485 communication can be realized. With reference to FIG. 2, another connection polarity is that the first communication port A1 is connected to the fourth communication port B2 and the second communication port B1 is connected to the third communication port A2, and in such a way that the connection polarity between the first communication chip U2 and the second communication chip U4 is wrong, and RS-485 communication cannot be realized.

The first communication chip U2 may be switched between sending and receiving states through the first enabling port DE1, and similarly, the second communication chip U4 may be switched between sending and receiving states through the second enabling port DE2/RE. When the second communication node 102 sends a level signal to the first communication node 101, the level signal is sent to the second input port D2 through the primary output port TxD2, converted into a differential signal through the second communication chip U4, and transmitted to the first communication chip U2 through the first signal line 105 and the second signal line 106 respectively, and the first communication chip U2 reduces the differential signal into the level signal and sends the level signal to the secondary input port RxD1 through the first output port R1. When the first communication node 101 sends a level signal to the second communication node 102, the level signal is sent to the first input port D1 through the secondary output port TxD1, converted into a differential signal through the first communication chip U2, and transmitted to the second communication chip U4 through the first signal line 105 and the second signal line 106 respectively, and the second communication chip U4 reduces the differential signal into the level signal and sends the level signal to the primary input port RxD2 through the second output port R2.

If the connection polarity between the first communication chip U2 and the second communication chip U4 is wrong, the above communication process of the first communication node 101 and the second communication node 102 cannot be realized.

Therefore, in an embodiment, the communication circuit is provided with a voltage division assembly 107. The voltage division assembly 107 is connected to the first signal line 105 and the second signal line 106 respectively, to enable a voltage value of the first signal line 105 to be higher than that of the second signal line 106 when the first signal line 105 and the second signal line 106 are in an idle state.

In an embodiment, the voltage division assembly 107 includes a first resistor r1, a second resistor r2 and a third resistor r3. The first resistor r1 is connected between a power end and the first signal line 105, the second resistor r2 is connected between the first signal line 105 and the second signal line 106, and the third resistor r3 is connected between the second signal line 106 and the reference ground. The first control chip U1 is further provided with a detection port P01, the detection port P01 is connected to the first output port R1 to acquire the level signal output by the first output port R1, and a correctness of a connection polarity between the first communication chip U2 and the second communication chip U4 may be determined through the level signal output by the first output port R1, which can be realized without adding complicated components.

Those skilled in the art may understand that the voltage division assembly 107 may be other similar resistive elements besides the resistors, or it is possible to use other similar connection solutions as long as the voltage value of the first signal line 105 is higher than that of the second signal line 106 when the first signal line 105 and the second signal line 106 are in an idle state.

In a further embodiment, when the first signal line 105 and the second signal line 106 are in an idle state, that is, no signal is transmitted between the first communication node 101 and the second communication node 102, the first resistor r1 may pull up the first signal line 105 to VCC, and the second resistor r2 may pull down the second signal line 106 to GND. Therefore, the voltage value of the first signal line 105 is higher that of the second signal line 106. According to a basic principle that the first communication chip U2 converts the RS-485 differential signal into a level signal, and the level signal of the first output port R1 is acquired through the detection port P01, which means that a level relationship between the first communication port A1 and the second communication port B1 may be obtained, so that a corresponding connection relationship of the first signal line 105 and the second signal line 106 with the first communication port A1 and the second communication port B1 may be determined, thus determining the correctness of the connection polarity between the first communication chip U2 and the second communication chip U4. Since a level relationship between the first signal line 105 and the second signal line 106 cannot be determined during communication of the first communication node 101 and the second communication node 102, the correctness of the connection polarity between the first communication chip U2 and the second communication chip U4 cannot be determined according to the level signal of the first output port R1. Therefore, a correctness of determination can be improved by determining the correctness of the connection polarity when the first signal line 105 and the second signal line 106 are in an idle state.

In an embodiment, with reference to FIG. 1 and FIG. 2, since the voltage value of the first signal line 105 is higher than that of the second signal line 106, when the level signal of the first output port R1 is of a high level, it is proved that a voltage value of the first communication port A1 is higher than that of the second communication port B1, and the connection polarity between the first communication chip U2 and the second communication chip U4 is correct; and when the level signal of the first output port R1 is of a low level, it is proved that the voltage value of the first communication port A1 is lower than that of the second communication port B1, and the connection polarity between the first communication chip U2 and the second communication chip U4 is wrong. Those skilled in the art may understand that the determination above is suitable for other communication chips with a similar structural principle to the first communication chip U2, and a corresponding relationship between the level signal of the first output port R1 and the connection polarity may be adjusted according to a structure of a chip.

In an embodiment, the determination of the connection polarity may be made in two situations, one of the situations is that the first communication node 101 and the second communication node 102 are electrified for the first time, and another situation is that the first communication node 101 is reconnected with the second communication node 102 once disconnection occurs during communication. When the first communication node 101 and the second communication node 102 are electrified for the first time, both the first communication chip U2 and the second communication chip U4 are configured in a receiving state, and the first signal line 105 and the second signal line 106 are in an idle state. When the first communication node 101 is reconnected with the second communication node 102 once disconnection occurs during communication, both the first communication chip U2 and the second communication chip U4 are configured in a bus release state, and the first signal line 105 and the second signal line 106 are in an idle state.

In an embodiment, in order to improve the correctness of determination, a duration of the low level of the first output port R1 may be longer than or equal to an idle duration of the first signal line 105 and the second signal line 106 when it comes to determine the connection polarity is correct, and the same is applied when it comes to determine the connection polarity is wrong.

In an embodiment, when the connection polarity between the first communication chip U2 and the second communication chip U4 is wrong, a polarity between the first communication port A1 and the second communication port B1 may be switched through the switching port INV2 in the first communication chip U2, which means that the first communication port A1 and the second communication port B1 are exchanged, so that the first signal line 105 and the second signal line 106 are rematched, and the communication of the first communication node 101 and the second communication node 102 is restored, thus ensuring a stability of communication. It can be understood that the switching port INV2 may also be arranged in the second communication chip U4. In a practical application, a non-polar RS-485 communication chip is provided with the above-mentioned polarity switching function.

In an embodiment, an absolute voltage value between two ends of the second resistor r2 is higher than a differential voltage value corresponding to the level signal of the first communication chip U2 or the second communication chip U4, where the absolute voltage value between two ends of the second resistor r2 is VCC*r2/(r1+r2+r3). By arranging a resistance value relationship among the first resistor r1, the second resistor r2 and the third resistor r3, the absolute voltage value between two ends of the second resistor r2 is higher than the differential voltage value corresponding to the level signal of the first communication chip U2 or the second communication chip U4 (which is namely a differential voltage value between the first communication port A1 and the second communication port B1, and a differential voltage value between the third communication port A2 and the fourth communication port B2), thus ensuring that the first communication chip U2 and the second communication chip U4 can communicate normally.

In an embodiment, the second resistors r2 are arranged between the first communication port A1 and the second communication port B1, and between the third communication port A2 and the fourth communication port B2. Since there are discontinuous characteristic impedance in the first signal line 105 and the second signal line 106, the second resistors r2 are arranged between the first communication port A1 and the second communication port B1, and between the third communication port A2 and the fourth communication port B2, to eliminate a reflected signal generated by the characteristic impedance of the first signal line 105 and the second signal line 106, and communication of the first communication node 101 and the second communication node 102 swill be more stable and reliable.

In addition, the first resistor r1 pulls up the first signal line 105 to VCC, and the third resistor r3 pulls down the second signal line 106 to GND, which may keep the first signal line 105 and the second signal line 106 in an idle state at a high level even in the case of a strongest transmitted signal, thus improving a stability of communication.

Figure 3:
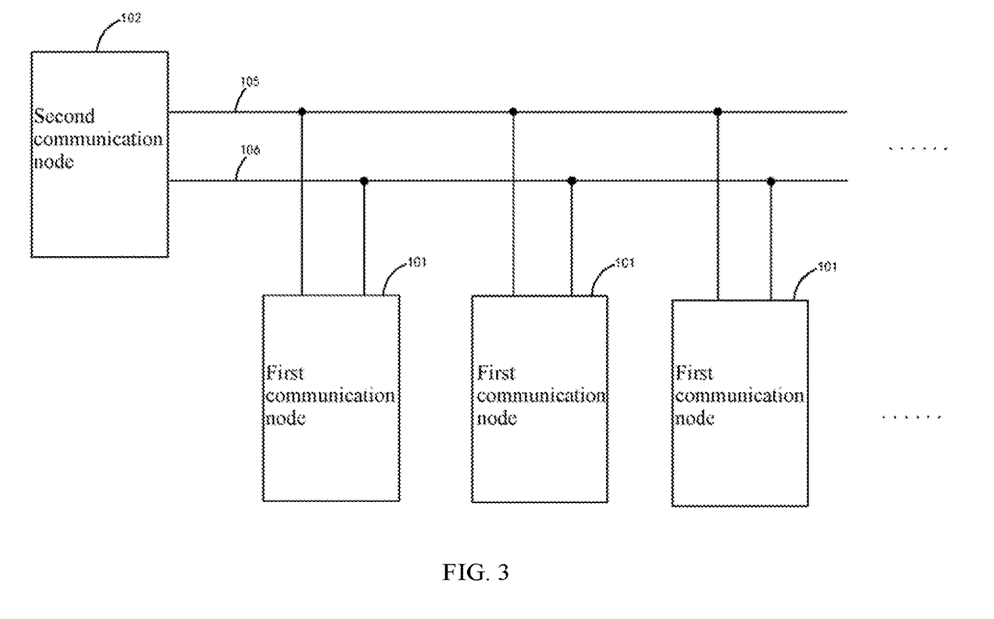
FIG. 3 is a schematic architecture diagram of a communication circuit provided by an embodiment of the present disclosure.

In an embodiment, with reference to FIG. 3, more than two second communication nodes 102 may be provided, and the first signal line 105 and the second signal line 106 are used as connection buses to respectively connect the first communication node 101 with the second communication nodes 102. By providing a plurality of second communication nodes 102 and connecting the first communication node 101 with the second communication nodes 102 through a connection bus, a signal transmission system can be formed, and a multi-split solution is realized.

In an embodiment, in a practical application, taking the air conditioning system as an example, the first communication node 101 may be an internal unit of an air conditioner, and the second communication node 102 may be an external unit of the air conditioner. If more than two first communication nodes 101 are provided, the first communication node 101 may be a secondary external unit or internal unit of the air conditioner.

To sum up, according to the communication circuit provided by embodiments of the present disclosure, the correctness of the connection polarity between the first communication node 101 and the second communication node 102 can be determined quicker than the passive waiting method, thus improving a communication efficiency. Moreover, according to the communication circuit, the correctness of the connection polarity between two communication nodes in RS-485 communication can be quickly determined without adding complicated components.

Figure 4:
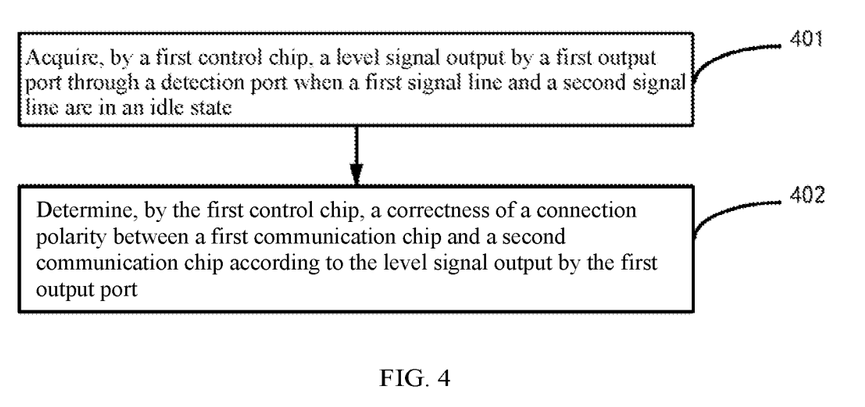
FIG. 4 is a flow chart of a communication control method provided by an embodiment of the present disclosure.

In addition, with reference to FIG. 4, an embodiment of the present disclosure further provides a communication control method applied to the communication circuit shown in FIG. 1 or FIG. 2. The communication control method includes but is not limited to the following steps of:

step 401: acquiring, by the first control chip, a level signal output by the first output port through the detection port when the first signal line and the second signal line are in an idle state; and step 402: determining, by the first control chip, a correctness of a connection polarity between the first communication chip and the second communication chip according to the level signal output by the first output port.

By providing a voltage division assembly, the voltage value of the first signal line is higher than that of the second signal line when the first signal line and the second signal line are in an idle state, then by providing a detection port on the first control chip to acquire the level signal of the first output port of the first communication chip, since the voltage value of the first signal line is higher than that of the second signal line, the correctness of the connection polarity between the first communication chip and the second communication chip may be determined according to the level signal of the first output port, and the correctness of the connection polarity between the first communication node and the second communication node can be determined quicker than the passive waiting method, thus improving a communication efficiency.

In step 402, the determining, by the first control chip, the correctness of the connection polarity between the first communication chip and the second communication chip according to the level signal output by the first output port, may include at least one of the followings:

determining, by the first control chip, the connection polarity between the first communication chip and the second communication chip to be correct when the level signal of the first output port is of a high level; and determining, by the first control chip, the connection polarity between the first communication chip and the second communication chip to be wrong when the level signal of the first output port is of a low level;

determining, by the first control chip, the connection polarity between the first communication chip and the second communication chip to be correct when the level signal of the first output port is of a high level with a duration longer than or equal to an idle duration of the first signal line and the second signal line; and determining, by the first control chip, the connection polarity between the first communication chip and the second communication chip to be wrong when the level signal of the first output port is of a low level with a duration longer than or equal to an idle duration of the first signal line and the second signal line.

The duration of the level signal of the first output port determined to be longer than or equal to the idle duration of the first signal line and the second signal line is beneficial for improving a correctness of determination.

Figure 5:
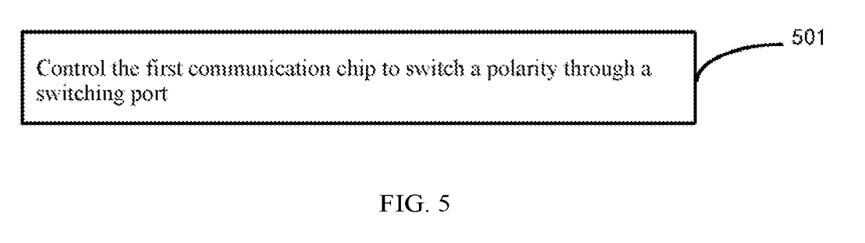
FIG. 5 is a flow chart of the communication control method with supplementary steps provided by an embodiment of the present disclosure.

In an embodiment, with reference to FIG. 5, when the connection polarity between the first communication chip and the second communication chip is determined to be wrong by the first control chip, the communication control method above further includes the following step of:

step 501: controlling, by the first communication chip, to switch a polarity through a switching port.

A polarity is switched when the connection polarity between the first communication node and the second communication node is wrong, to restore the communication between the first communication node and the second communication node, thus ensuring a stability of communication.

In an embodiment, in step 401, the first signal line and the second signal line being in an idle state includes at least one of the followings:

in a scenario that the first communication node and the second communication node are electrified for a first time, both the first communication chip and the second communication chip are set to be in a receiving state; and in a scenario that the first communication node is reconnected to the second communication node after disconnection occurs during communication, both the first communication chip and the second communication chip are set to be in a bus release state.

When the first communication node and the second communication node are electrified for the first time, both the first communication chip and the second communication chip are set to be in the receiving state, which can ensure that the first signal line and the second signal line have no communication transmission, so that the voltage value of the first signal line is high relative to the second signal line, thus facilitating the determination of the connection polarity; and when the first communication node is reconnected with the second communication node once disconnection occurs during communication, both the first communication chip and the second communication chip are set to be in the bus release state, and no communication is transmitted between the first signal line and the second signal line, the voltage value of the first signal line is higher than that of the second signal line, thus facilitating the determination of the connection polarity.

Figure 6:
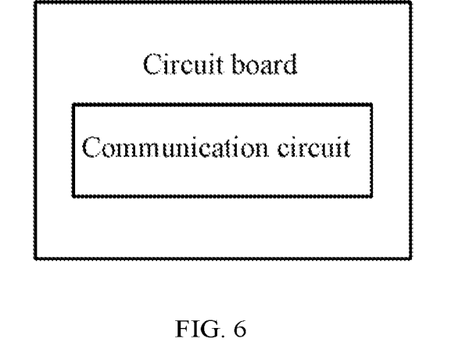
FIG. 6 is a brief schematic structural diagram of a circuit board provided by an embodiment of the present disclosure.

With reference to FIG. 6, FIG. 6 shows a circuit board provided by an embodiment of the present disclosure, which includes the communication circuit in the embodiment above. Therefore, according to the circuit board above, by providing a voltage division assembly, the voltage value of the first signal line is higher than that of the second signal line when the first signal line and the second signal line are in an idle state, then by providing a detection port on the first control chip to acquire the level signal of the first output port of the first communication chip, since the voltage value of the first signal line is higher than that of the second signal line, the correctness of the connection polarity between the first communication chip and the second communication chip may be determined according to the level signal of the first output port, and the correctness of the connection polarity between the first communication node and the second communication node can be determined quicker than the passive waiting method, thus improving a communication efficiency.

Figure 7:
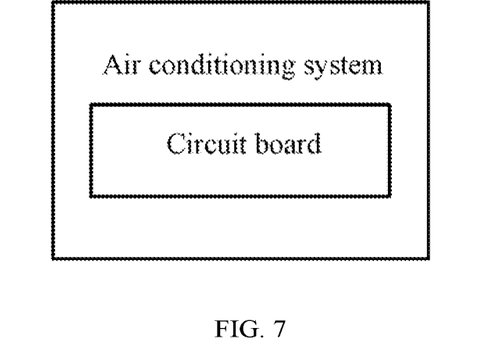
FIG. 7 is a brief schematic structural diagram of an air conditioner provided by an embodiment of the present disclosure.

With reference to FIG. 7, an embodiment of the present disclosure further provides an air conditioning system, and the air conditioning system includes the circuit board in the embodiment above. Therefore, according to the air conditioning system above, by providing a voltage division assembly, the voltage value of the first signal line is higher than that of the second signal line when the first signal line and the second signal line are in an idle state, then by providing a detection port on the first control chip to acquire the level signal of the first output port of the first communication chip, since the voltage value of the first signal line is higher than that of the second signal line, the correctness of the connection polarity of the first communication chip and the second communication chip may be determined according to the level signal of the first output port, and the correctness of the connection polarity between the first communication node and the second communication node can be determined quicker than the passive waiting method, thus improving a communication efficiency.

Figure 8:
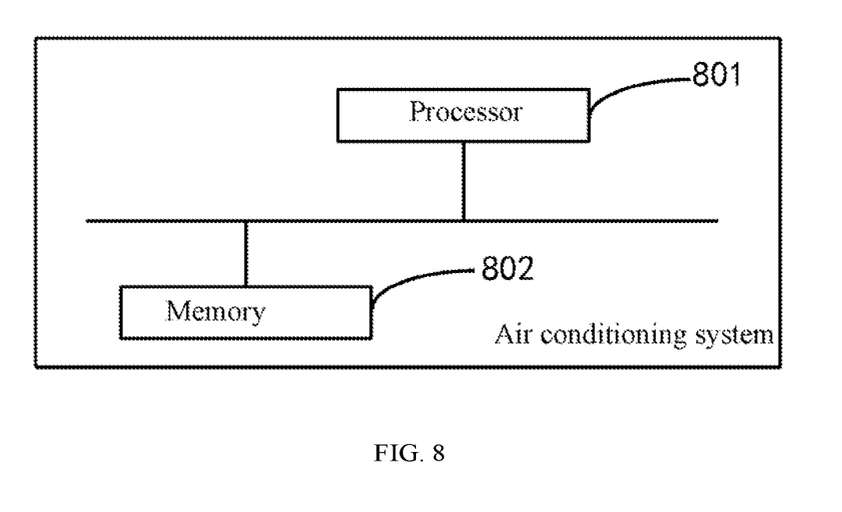
FIG. 8 is a brief schematic structural diagram of an air conditioner provided by another embodiment of the present disclosure.

With reference to FIG. 8, FIG. 8 is a schematic diagram of an air conditioning system provided by an embodiment of the present disclosure. The air conditioning system in embodiments of the present disclosure includes one or more processors 801 and a memory 802. An exemplary with one processor 801 and one memory 802 is shown in FIG. 8.

The processor 801 and the memory 802 may be connected by a bus or other connections. An exemplary with a connection bus is shown in FIG. 8.

The memory 802 is used as a non-transient computer-readable storage medium, and may be used for storing a non-transient software program and a non-transient computer-executable program. In addition, the memory 802 may include a high-speed random access memory 802, and may also include a non-transient memory 802, such as at least one disk memory device, flash memory device, or other non-transient solid-state memory devices. In some embodiments, the memory 802 may include a memory 802 remotely arranged relative to the processor 801, and these remote memories 802 may be connected to the operational control device through a network. Examples of the above network include but are not limited to the Internet, the Intranet, the local area network, the mobile communication network and a combination thereof.

Those skilled in the art may understand that the device structure shown in FIG. 8 does not constitute a limitation on the air conditioning system, and may include more or less components in different combination or arrangement in the drawings.

The non-transient software program and instruction required to implement the communication method applied to the air conditioning system in the embodiment above are stored in the memory 802, and when the program and instruction are executed by the processor 801, the communication method applied to the air conditioning system in the embodiment above is executed, such as executing the method steps 401 to 402 in FIG. 4 and the method step 501 in FIG. 5 described above.

The device embodiment described above is only illustrative, where the units described as separate components may or may not be physically separated, which means that the units may be located in one place or distributed to multiple network units. Some or all of the modules may be selected according to actual needs to achieve the objects of the solutions in the embodiments.

In addition, an embodiment of the present disclosure further provides a computer-readable storage medium, The computer-readable storage medium stores a computer-executable instruction, and the computer-executable instruction is executed by one or more processors 801. For example, when the computer-executable instruction is executed by one processor 801 in FIG. 8, the one or more processors 801 above may execute the communication method in the method embodiment above, such as executing the method steps 401 to 402 in FIG. 4 and the method step 501 in FIG. 5 described above.

Those of ordinary skills in the art may understand that all or some of steps and systems in the method disclosed above may be implemented as software, firmware, hardware and appropriate combinations thereof. Some or all of the physical components may be implemented as software executed by a processor, such as a central processing unit, a digital signal processor or a microprocessor, or implemented as hardware, or implemented as an integrated circuit, such as an application-specific integrated circuit. Such software may be distributed on a computer-readable medium, and the computer-readable medium may include a computer storage medium (or a non-transitory medium) and a communication medium (or a transitory medium). As well known to those of ordinary skills in the art, the term "computer storage medium" includes a volatile and nonvolatile, removable and non-removable medium implemented in any method or technology for storing information (such as a computer readable instruction, a data structure, a program module, or other data). The computer storage media include but are not limited to RAM, ROM, EEPROM, flash memory or other memory technologies, CD-ROM, digital versatile disk (DVD) or other optical disk storage, magnetic box, magnetic tape, magnetic disk storage or other magnetic storage devices, or any other media capable of being used to store desired information and accessed by a computer. Furthermore, it is well known to those of ordinary skills in the art that the communication media typically include a computer readable instruction, a data structure, a program module or other data in a modulated data signal such as a carrier wave or other transmission mechanism, and may include any information delivery medium.

The preferred embodiments of the present disclosure have been described in detail above, but the present disclosure is not limited to the embodiments described above. Those skilled in the art may further make various equivalent modifications or substitutions without departing from the spirit of the present disclosure, and these equivalent modifications or substitutions are all included in the scope defined by the claims of the present disclosure.

The invention claimed is:

1. A communication circuit comprising:
   a first communication node including:
      a first control chip; and
      a first communication chip connected to the first control chip and configured to transmit a differential signal, the first communication chip including an output port to output a level signal obtained from the differential signal to the first control chip;
   a second communication node including:
      a second control chip; and
      a second communication chip connected to the second control chip and configured to transmit the differential signal, the second communication chip being connected to the first communication chip through a first signal line and a second signal line; and
   a voltage division assembly connected to the first signal line and the second signal line, and configured to cause a voltage value of the first signal line to be higher than a voltage value of the second signal line when the first signal line and the second signal line are in an idle state;
   wherein the first control chip includes a detection port connected to the output port to acquire the level signal output by the output port, and the level signal output by the output port is used for determining a correctness of a connection polarity between the first communication chip and the second communication chip.

2. The communication circuit according to claim 1, wherein the voltage division assembly includes:
   a first resistive element connected between a power end and the first signal line;
   a second resistive element connected between the first signal line and the second signal line; and
   a third resistive element connected between the second signal line and a reference ground.

3. The communication circuit according to claim 2, wherein an absolute voltage value between two ends of the second resistive element is higher than a differential voltage value corresponding to the level signal of the first communication chip or a level signal of the second communication chip.

4. The communication circuit according to claim 2, wherein:
   the first communication chip includes a first differential signal port, and the first differential signal port includes a first communication port and a second communication port;
   the second communication chip includes a second differential signal port, and the second differential signal port includes a third communication port and a fourth communication port;
   the first differential signal port and the second differential signal port are connected to each other through the first signal line and the second signal line; and
   the second resistive element is one of two second resistive elements, a first one of the two second resistive elements is arranged between the first communication port and the second communication port, and a second one of the two second resistive element is arranged between the third communication port and the fourth communication port.

5. The communication circuit according to claim 1, wherein at least one of the first communication chip or the second communication chip includes a switching port to switch the connection polarity.

6. The communication circuit according to claim 1, wherein:
the first communication node is one of two or more first communication nodes; and
the first signal line and the second signal line are configured as connection buses to connect the second communication node to the two or more first communication nodes.

7. A circuit board comprising the communication circuit according to claim 1.

8. An air conditioning system comprising the circuit board according to claim 7.

9. A communication control method applied to a communication circuit,
wherein the communication circuit includes:
a first communication node including:
a first control chip including a detection port; and
a first communication chip connected to the first control chip and configured to transmit a differential signal, the first communication chip including an output port to output a level signal obtained from the differential signal to the first control chip, and the output port being connected to the detection port;
a second communication node including:
a second control chip; and
a second communication chip connected to the second control chip and configured to transmit the differential signal, the second communication chip being connected to the first communication chip through a first signal line and a second signal line; and
a voltage division assembly connected to the first signal line and the second signal line, and configured to cause a voltage value of the first signal line to be higher than a voltage value of the second signal line when the first signal line and the second signal line are in an idle state;
the communication control method comprising:
acquiring, by the first control chip through the detection port, a level signal output by the output port when the first signal line and the second signal line are in the idle state; and
determining, by the first control chip, a correctness of a connection polarity between the first communication chip and the second communication chip according to the level signal output by the output port.

10. The communication control method according to claim 9, wherein determining, by the first control chip, the correctness of the connection polarity between the first communication chip and the second communication chip according to the level signal output by the output port includes at least one of:
determining, by the first control chip, the connection polarity between the first communication chip and the second communication chip to be correct in response to the level signal of the output port being of a high level; or
determining, by the first control chip, the connection polarity between the first communication chip and the second communication chip to be wrong in response to the level signal of the output port being of a low level.

11. The communication control method according to claim 9, wherein determining, by the first control chip, the correctness of the connection polarity between the first communication chip and the second communication chip according to the level signal output by the output port includes at least one of:
determining, by the first control chip, the connection polarity between the first communication chip and the second communication chip to be correct in response to the level signal of the output port being of a high level with a duration longer than or equal to an idle duration of the first signal line and the second signal line; or
determining, by the first control chip, the connection polarity between the first communication chip and the second communication chip to be wrong in response to the level signal of the output port being of a low level with a duration longer than or equal to the idle duration of the first signal line and the second signal line.

12. The communication control method according to claim 9,
wherein the first communication chip includes a switching port to switch the connection polarity;
the communication control method further comprising:
controlling, by the first control chip, the first communication chip to switch a polarity through the switching port in response to the connection polarity between the first communication chip and the second communication chip being wrong.

13. The communication control method according to claim 9, wherein the first signal line and the second signal line being in the idle state includes at least one of:
in a scenario that the first communication node and the second communication node are electrified for a first time, both the first communication chip and the second communication chip being set to be in a receiving state; or
in a scenario that the first communication node is reconnected to the second communication node after disconnection occurs during communication, both the first communication chip and the second communication chip being set to be in a bus release state.

14. A non-transitory computer-readable storage medium storing computer-executable instructions that, when executable by a computer, cause the computer to perform the communication control method according to claim 9.

15. An air conditioning system comprising:
at least one processor; and
a memory communicated with the at least one processor and storing instructions that, when executable by the at least one processor, cause the at least one processor to perform the communication control method according to claim 9.

16. A communication circuit comprising:
a control chip; and
a communication chip connected to the control chip and configured to transmit a differential signal through a first signal line and a second signal line, the communication chip including an output port to output a level signal obtained from the differential signal to the control chip;
wherein the control chip includes a detection port connected to the output port to acquire the level signal output by the output port, and the level signal output by the output port is used for determining a correctness of a connection polarity between the communication chip and the first signal line or the second signal line.

17. A circuit board comprising the communication circuit according to claim 16.

18. An air conditioning system comprising the circuit board according to claim 17.

\* \* \* \* \*